US009745008B2

(12) United States Patent
Ben-Yair et al.

(10) Patent No.: US 9,745,008 B2
(45) Date of Patent: Aug. 29, 2017

(54) MOTORCYCLE ANTI-THEFT DEVICE

(71) Applicants: Alon Ben-Yair, Rishon Lezion (IL); Gil Rotschild, Rishon Lezion (IL)

(72) Inventors: Alon Ben-Yair, Rishon Lezion (IL); Gil Rotschild, Rishon Lezion (IL)

(73) Assignee: G.A. KITS DEVELOPMENT LTD, Rishon Lezion, IL (US)

( * ) Notice: Subject to any disclaimer, the term of this patent is extended or adjusted under 35 U.S.C. 154(b) by 0 days.

(21) Appl. No.: 15/000,861

(22) Filed: Jan. 19, 2016

(65) Prior Publication Data

US 2016/0129959 A1    May 12, 2016

Related U.S. Application Data

(63) Continuation of application No. PCT/IL2014/050642, filed on Jul. 16, 2014.

(30) Foreign Application Priority Data

Jul. 18, 2013    (IL) .......................................... 227546

(51) Int. Cl.
*B62H 1/02*    (2006.01)
*B62H 5/00*    (2006.01)

(52) U.S. Cl.
CPC ............. *B62H 5/005* (2013.01); *B62H 1/02* (2013.01)

(58) Field of Classification Search
CPC .................................. B62H 5/005; B62H 1/02
See application file for complete search history.

(56) References Cited

U.S. PATENT DOCUMENTS

| 4,084,656 | A | * | 4/1978 | Itoh | B60K 28/00 180/219 |
| 4,223,906 | A | * | 9/1980 | Gratza | B62H 1/02 180/219 |
| 4,298,211 | A | * | 11/1981 | Shitamori | B62H 5/005 280/297 |
| 4,444,407 | A | * | 4/1984 | Calmonte | B62H 5/005 280/297 |
| 4,693,488 | A | * | 9/1987 | Bernocco | B62H 5/005 280/293 |
| 4,976,452 | A | * | 12/1990 | Fujita | B62H 1/02 280/293 |
| 5,029,667 | A | * | 7/1991 | Fujita | B62H 1/02 180/219 |
| 5,100,164 | A | * | 3/1992 | Miyamaru | B62H 1/00 180/219 |

(Continued)

FOREIGN PATENT DOCUMENTS

| GB | 2284188 | 5/1995 |
| GB | 2481061 | 12/2011 |

(Continued)

*Primary Examiner* — Joseph Rocca
*Assistant Examiner* — Michael Stabley
(74) *Attorney, Agent, or Firm* — Mark David Torche; Patwrite LLC

(57) ABSTRACT

A motorcycle anti-theft device, for a motorcycle of the type having a pivotable kickstand; a chassis; and an electrical power source. The device includes a mechanism configured to lock the kickstand after being set to a lowered position; and an actuator unit including an electromechanical device connected to the power source configured to directly drive, when activated, an element to unlock said kickstand.

19 Claims, 19 Drawing Sheets

(56) References Cited

U.S. PATENT DOCUMENTS

| | | | |
|---|---|---|---|
| 5,114,167 A * | 5/1992 | Shieh | B62H 5/005 280/297 |
| 5,216,909 A | 6/1993 | Armoogam | |
| 5,553,471 A * | 9/1996 | Hanners | B62H 5/005 248/688 |
| 6,170,846 B1 * | 1/2001 | Holter | B62H 1/02 280/293 |
| 6,536,792 B2 * | 3/2003 | Strasser | B62H 5/005 280/293 |
| 6,733,025 B2 * | 5/2004 | Su et al. | B62H 1/02 180/219 |
| 7,140,631 B2 * | 11/2006 | Ridley | B62H 1/02 280/301 |
| 7,681,902 B2 * | 3/2010 | Suzuki | B62H 1/04 280/293 |
| 8,201,655 B1 * | 6/2012 | Haag | B60R 25/005 180/287 |
| 2010/0013186 A1 | 1/2010 | Markie | |
| 2012/0139221 A1 | 6/2012 | Lo | |

FOREIGN PATENT DOCUMENTS

| | | |
|---|---|---|
| WO | 2007/099501 | 9/2007 |
| WO | 2009/113103 | 9/2009 |
| WO | 2009/147690 | 12/2009 |

\* cited by examiner

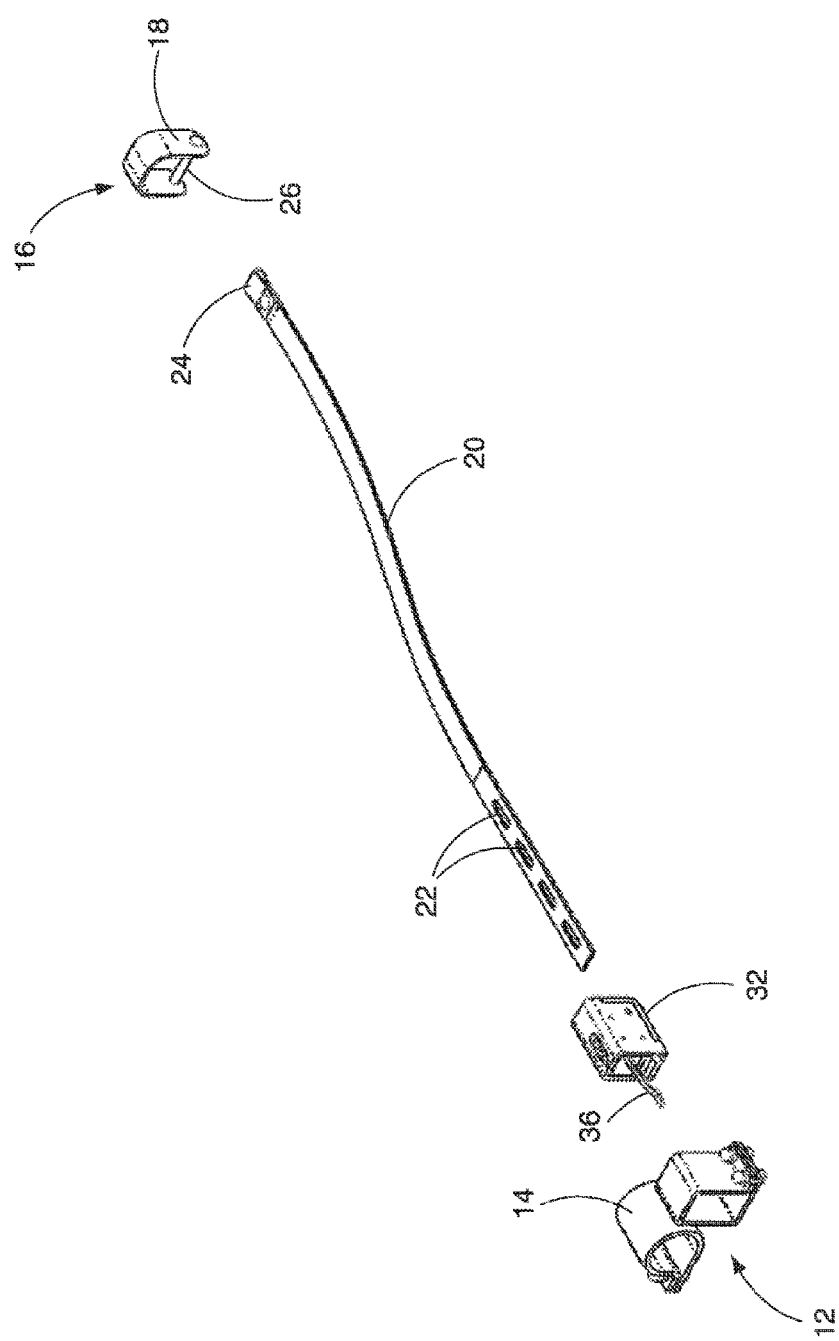

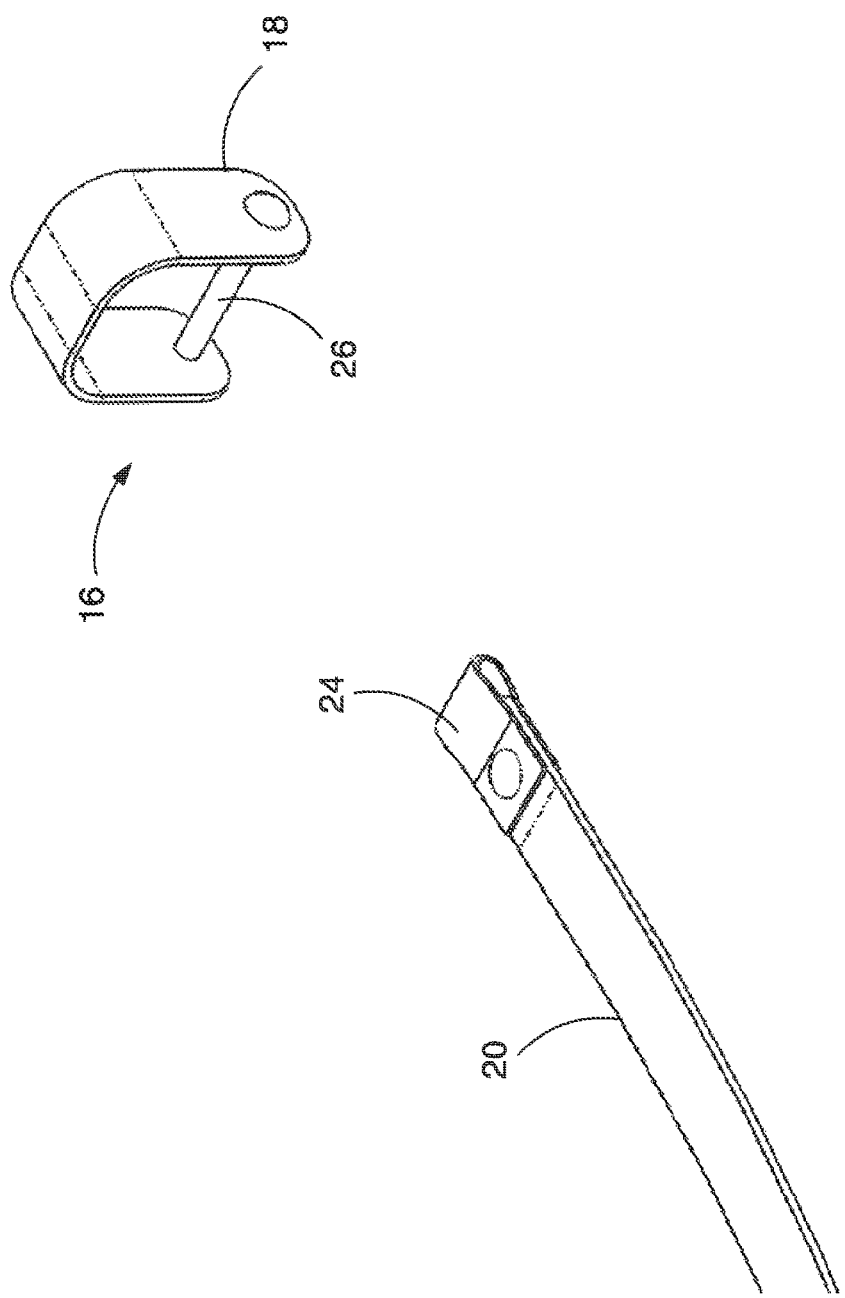

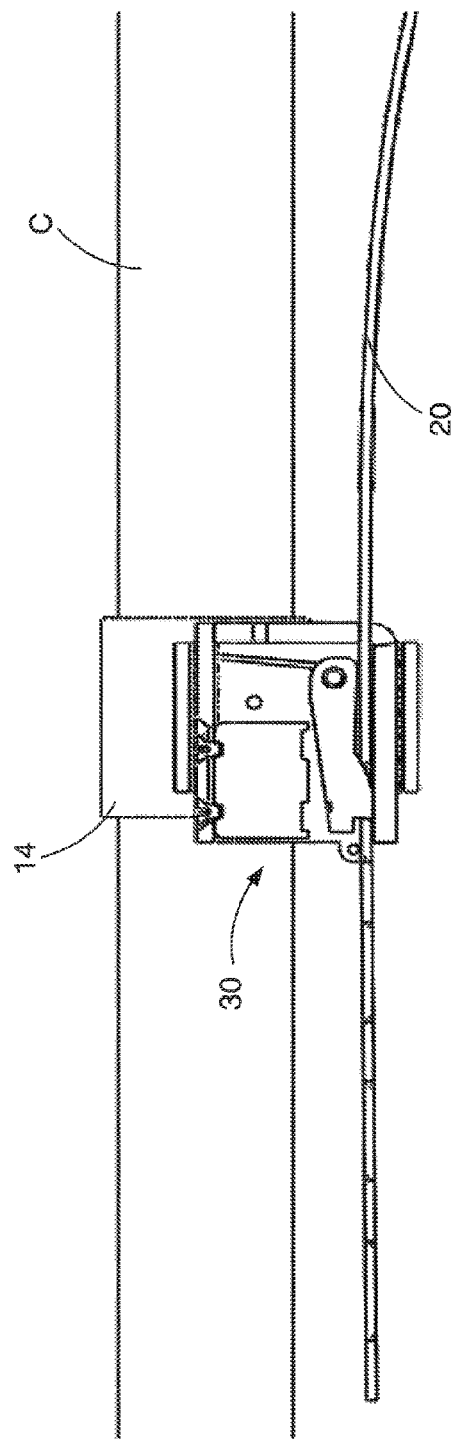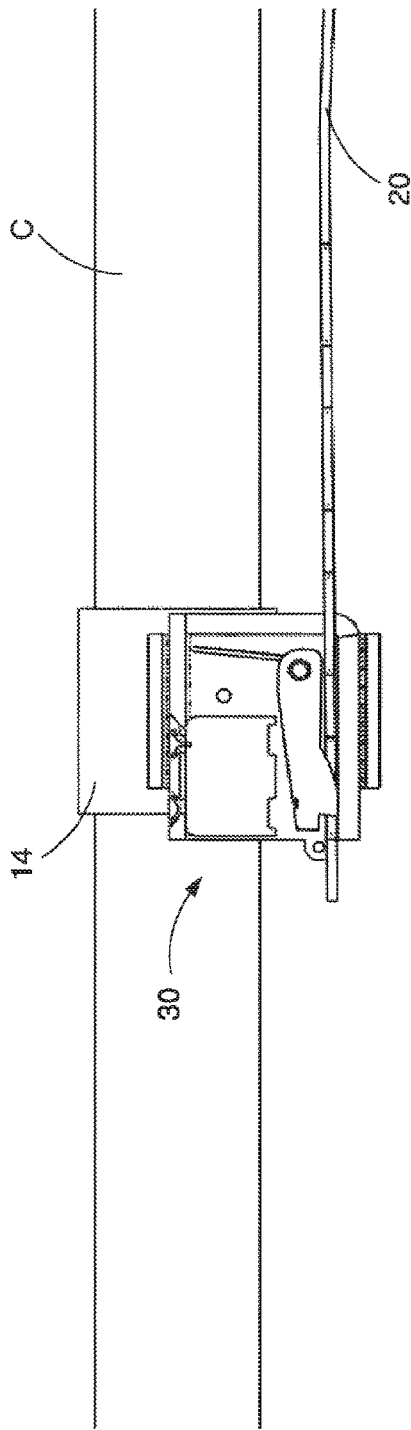

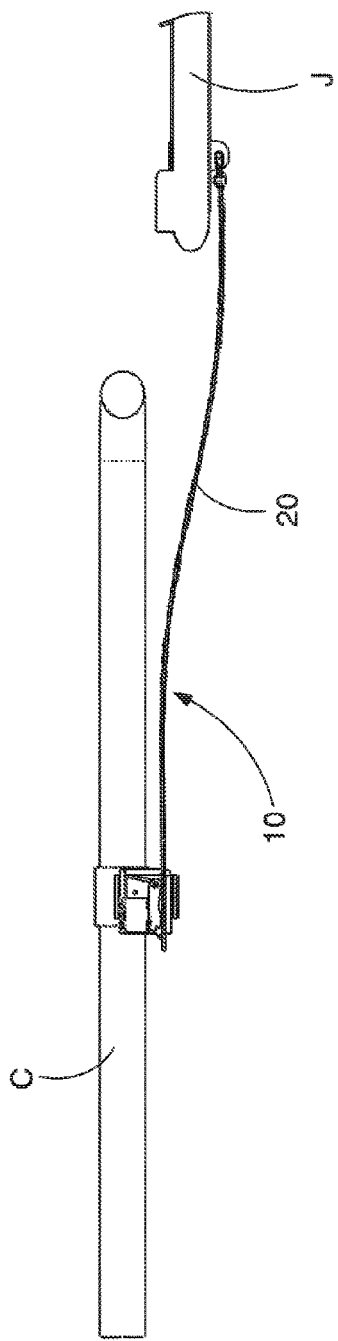
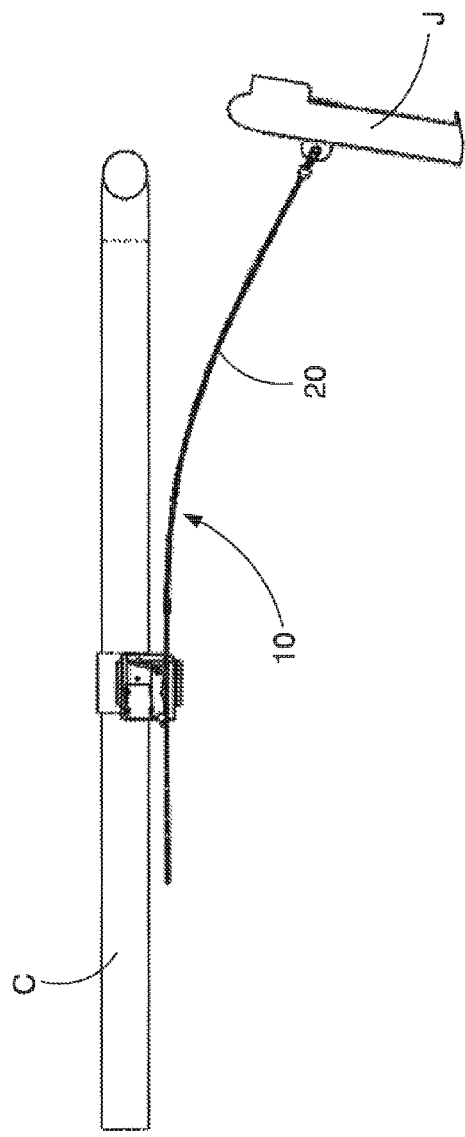
FIG. 12A
FIG. 12B

— 1 —

MOTORCYCLE ANTI-THEFT DEVICE

FIELD OF THE INVENTION

The present invention relates to security devices, in particular anti-theft locks.

BACKGROUND OF THE INVENTION

Theft of vehicles, in particular two-wheeled vehicles such as motorcycles and the like, which can be easily rolled away, continues to be a safety concern, a personal annoyance, and an economic issue.

Examples of mechanically actuated anti-theft devices are disclosed in: GB2481061, WO2009/113103, WO2007/099501, WO2009/147690, GB2284188, US2010/013186, and US2012/139221, which are incorporated herein in their entirety by reference.

SUMMARY OF THE INVENTION

The present invention provides a motorcycle anti-theft device, for a motorcycle of the type including a pivotable kickstand and a chassis and an electrical power source, which may be the motorcycle's battery. The device includes a mechanism for locking the kickstand after being set to a lowered position, and an actuator unit including an electro-mechanical device connected to the power source for directly driving, when activated, an element to unlock the kickstand.

As referred to herein, the term "motorcycle" includes any two wheeled vehicle having an electrical power source such as, but not limited to, a motor-scooter; an electric bicycle; a moped and the like. The term "kickstand" also includes any pivotal device for supporting the motorcycle when not in use, such as a jackstand.

It is a particular feature of the present invention to provide a lock that includes a locking mechanism for locking the kickstand of a motorcycle wherein the locking operation is actuated by lowering the kickstand and the unlocking operation is actuated by the ignition key.

BRIEF DESCRIPTION OF THE DRAWINGS

FIGS. 7A-7C are respective side, perspective and perspective exploded views of the motorcycle anti-theft device;

FIG. 8 is a perspective exploded view of an embodiment of a kickstand engagement mechanism of the motorcycle anti-theft device;

FIGS. 11A-11F are side views of the lock buckle components, FIGS. 11A, 11E and 11F showing unlocked configurations and FIGS. 11B-11D in locked configurations;

FIGS. 12A and 12B are side views illustrating the position of a locking band of the device in unlocked and locked positions, respectively;

DETAILED DESCRIPTION OF THE INVENTION

Illustrative embodiments of the invention are described below. In the interest of clarity, not all features/components of an actual implementation are necessarily described.

Figure 1:
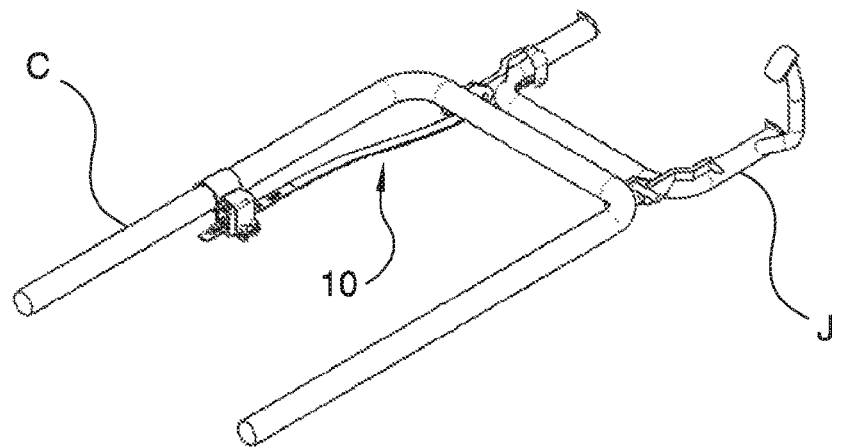
FIG. 1 is an upper perspective view of a motorcycle anti-theft device, according to one embodiment of the present invention, attached to the motorcycle's chassis and kickstand, wherein the kickstand is in the up position.
Figure 2:
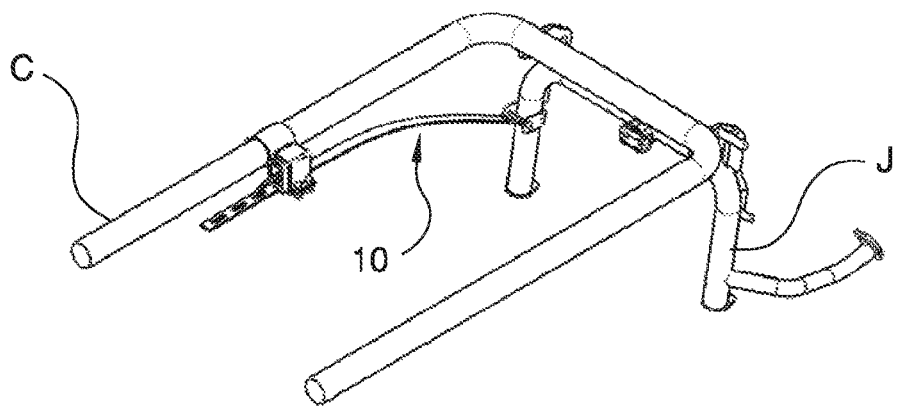
FIG. 2 is a view of FIG. 1, wherein the kickstand is in the down position.
Figure 3:
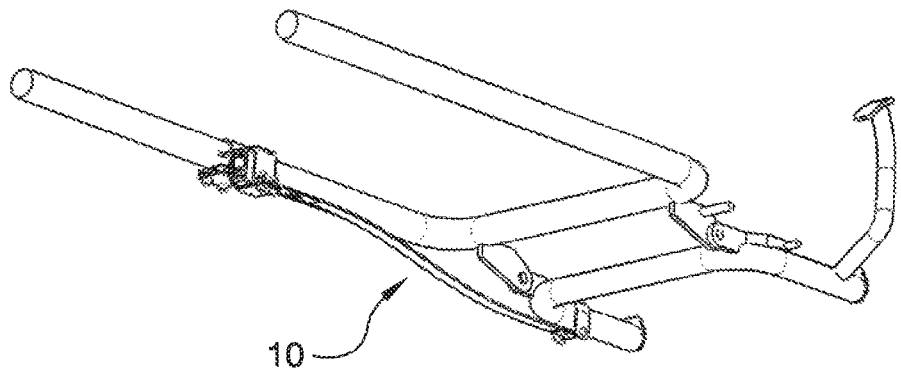
FIG. 3 is a lower perspective view of FIG. 1.
Figure 4:
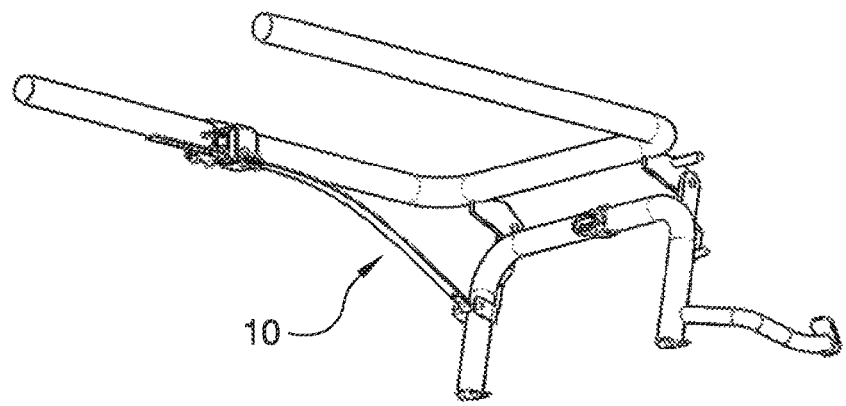
FIG. 4 is a lower perspective view of FIG. 2.
Figure 5:
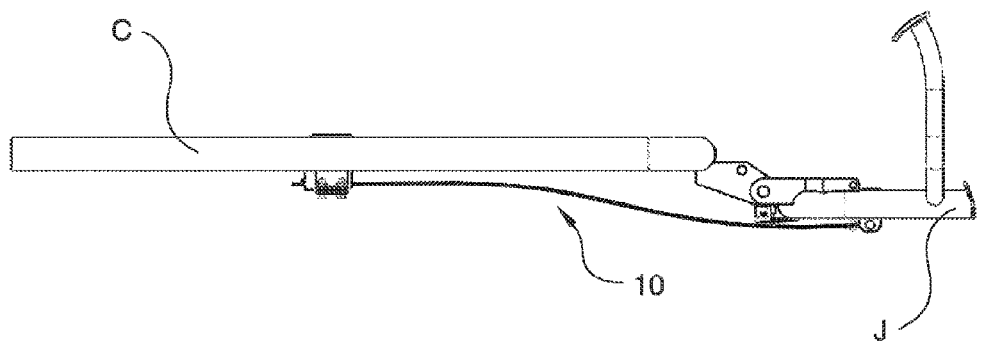
FIG. 5 is a side view of FIG. 1.
Figure 6:
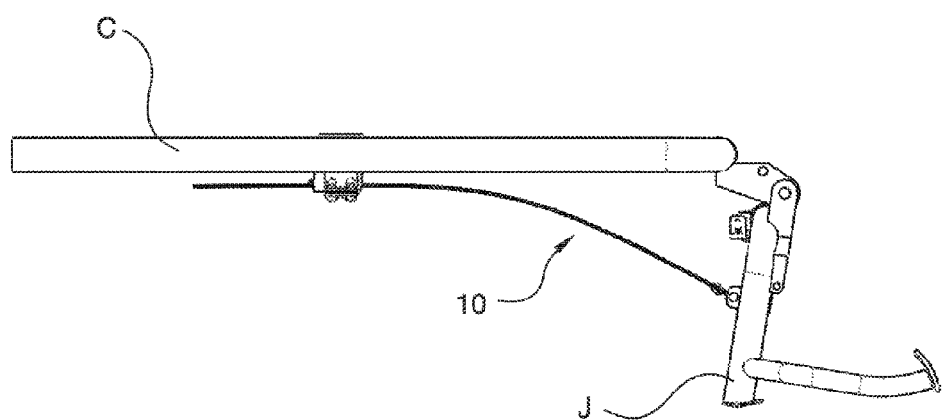
FIG. 6 is a side view of FIG. 2.

FIGS. 1-4 show perspective views and FIGS. 5-6 show side views of a motorcycle anti-theft device 10, according to one embodiment of the invention, which can alternatively be referred to as a kickstand lock apparatus 10 for a motorcycle, attached to a portion of a common type of chassis C, including a kickstand J, of the motorcycle. FIGS. 1, 3, and 5 show kickstand J in the "up" position; and FIGS. 2, 4 and 6 show kickstand J in the "down" position. It should be understood that the device (lock apparatus) can be designed to fit a variety of chassis types and kickstands, mutatis mutandis; and the invention is not limited in scope by the actual embodiments shown and association with the exemplary chassis illustrated merely for the purpose of providing an enabling description.

Figure 7A:
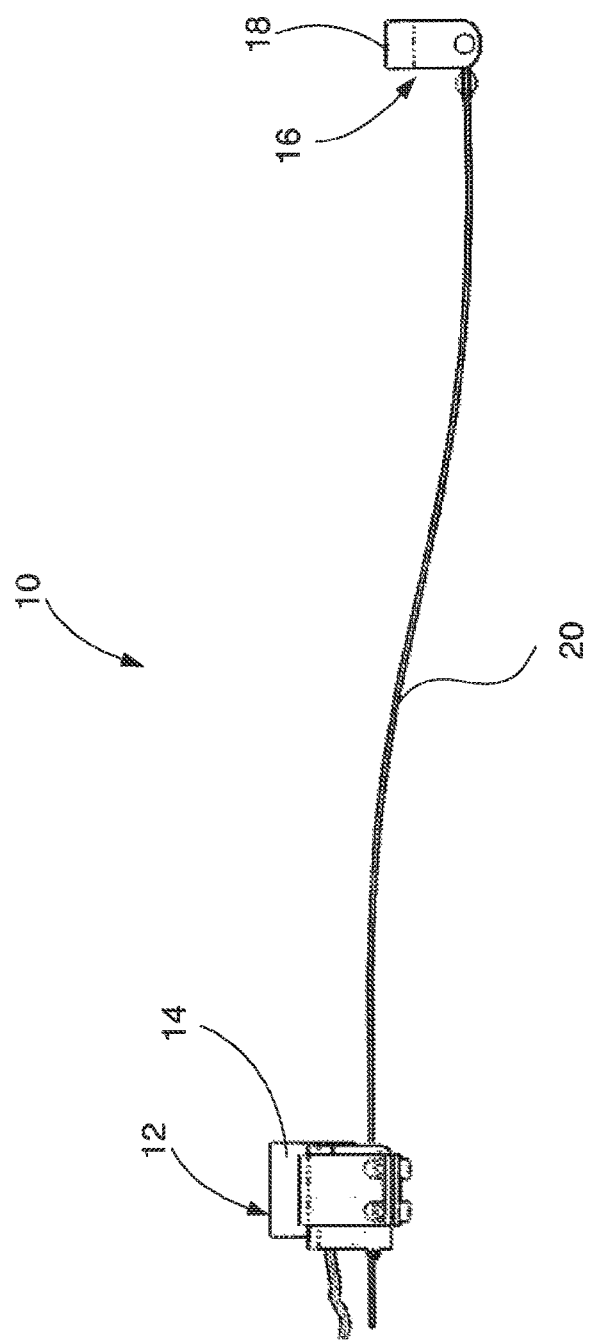
Figure 7B:
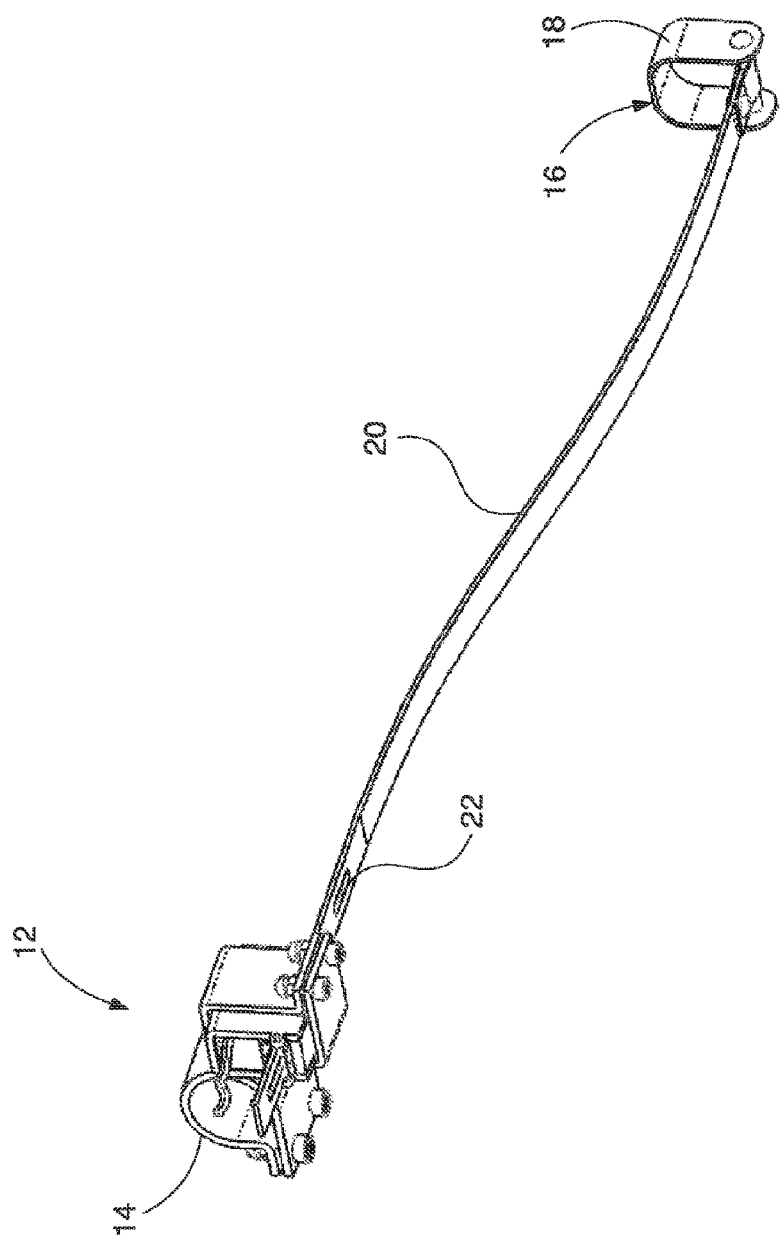

With further reference to FIGS. 7A-7C, showing respective isolated side, perspective and exploded perspective views of lock apparatus 10, the lock apparatus includes a chassis engaging mechanism 12 including a chassis engaging bracket 14, for fixing one end of the lock apparatus to chassis C; a kickstand engaging mechanism 16, including a kickstand engaging bracket 18, for attaching the other end of the lock apparatus to kickstand J; and a typically sturdy and semi-rigid locking strap or locking band 20, which at one end thereof is attached to kickstand engaging bracket 18 and at the other end of the band is at least one, and, for convenience of assembly, typically a plurality of openings 22 (seen clearly in FIG. 10).

Figure 9:
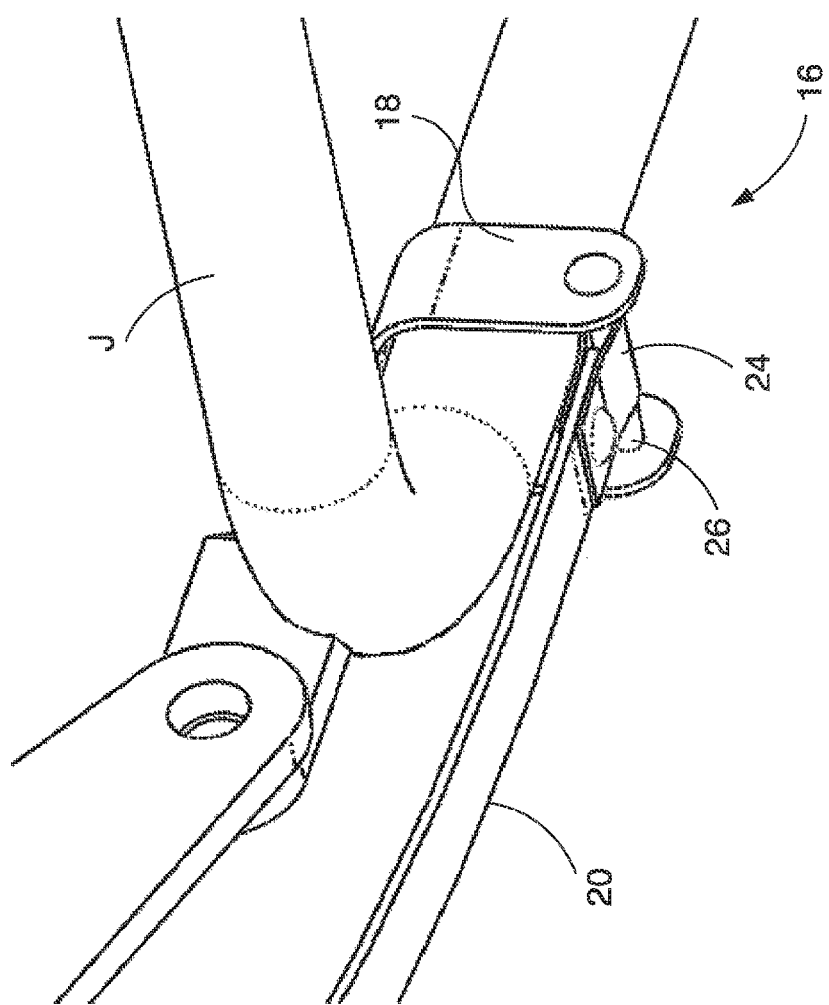
FIG. 9 is a perspective view of the kickstand engagement mechanism attached to the kickstand.

FIGS. 8 and 9 illustrate an embodiment of a band-to-kickstand engaging bracket fastening mechanism, exemplified by a fastening loop 24 and corresponding kickstand engaging bracket pin 26 for affixing locking band 20 to kickstand engaging bracket 18. As can be seen, kickstand engaging bracket 18 is attached to kickstand J whereby raising the kickstand pulls on locking band 20 in a direction toward the kickstand and lowering the kickstand relieves the tension, in fact provides a pushing effect on the semi-rigid band.

Figure 10A:
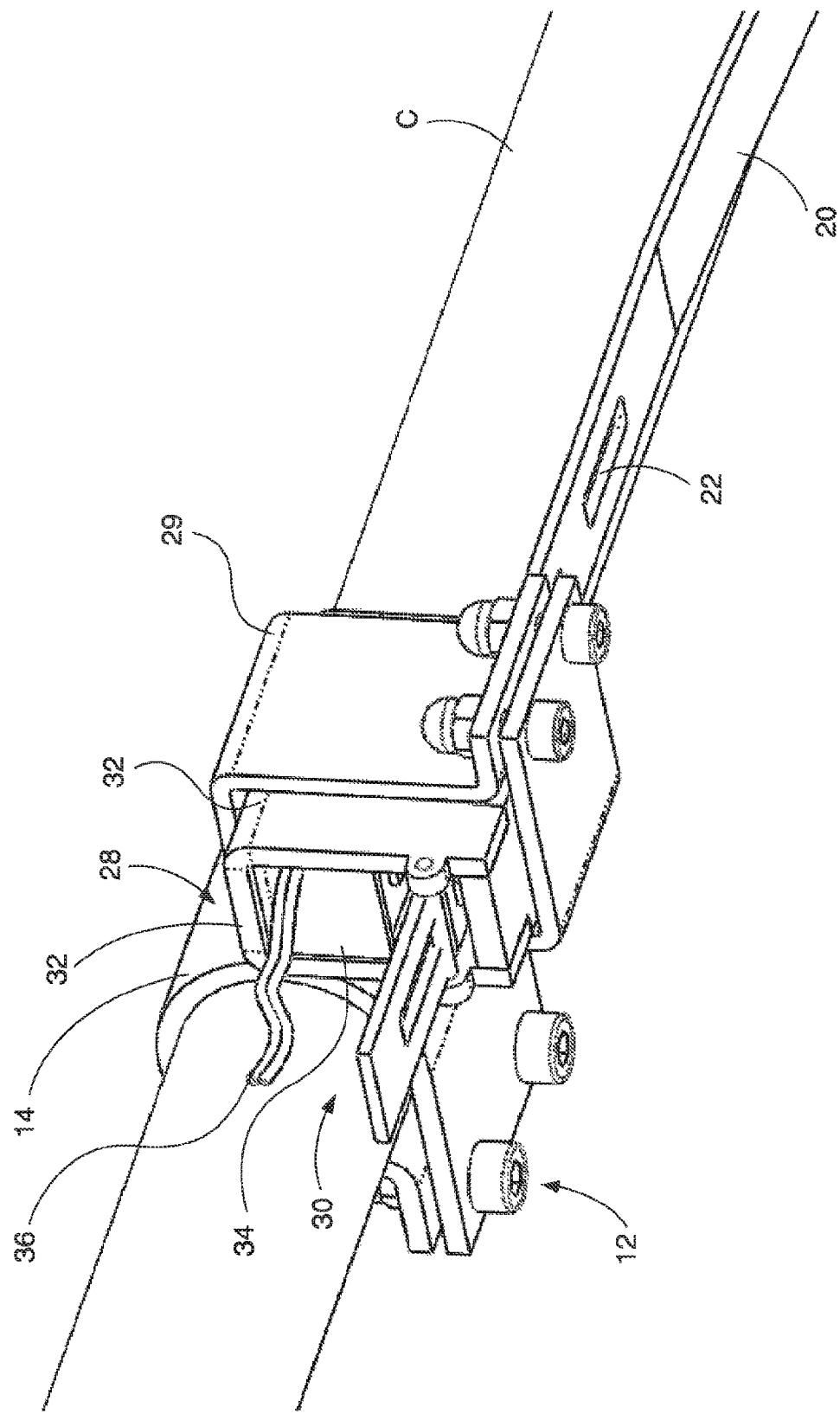
FIG. 10A is a perspective view of an embodiment of a chassis engagement mechanism and lock buckle of the motorcycle anti-theft device, attached to the motorcycle's chassis.
Figure 10B:
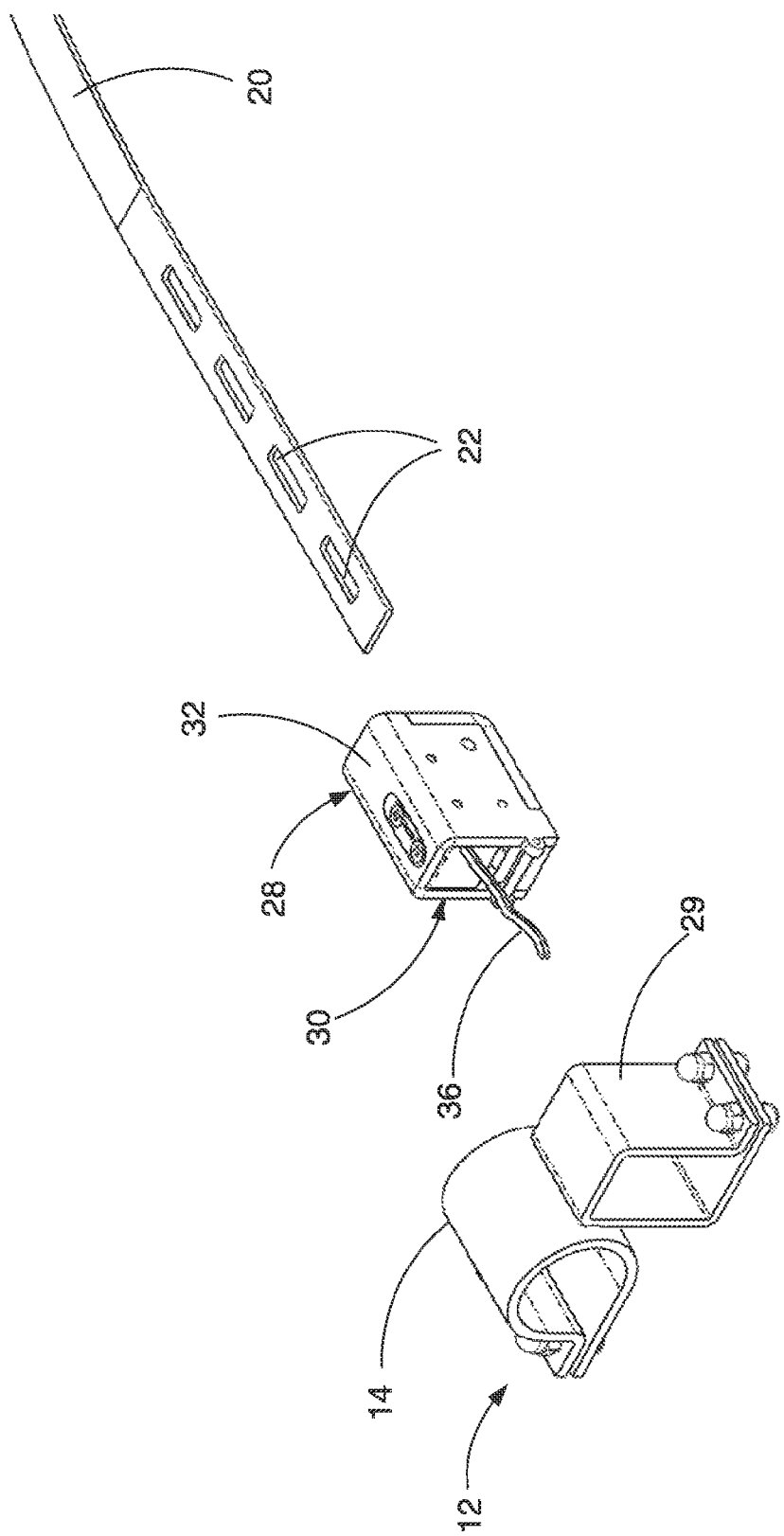
FIG. 10B is a exploded perspective view of the chassis engagement mechanism and view of the lock buckle of FIG. 10A.
Figure 11A:
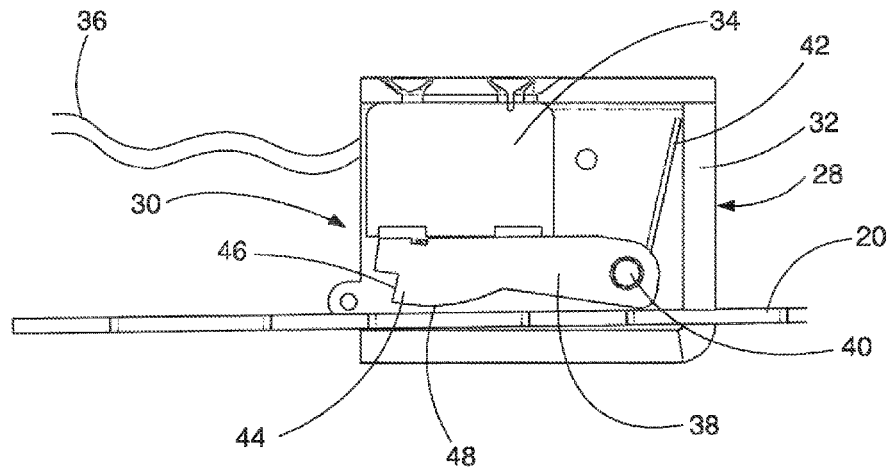
Figure 11B:
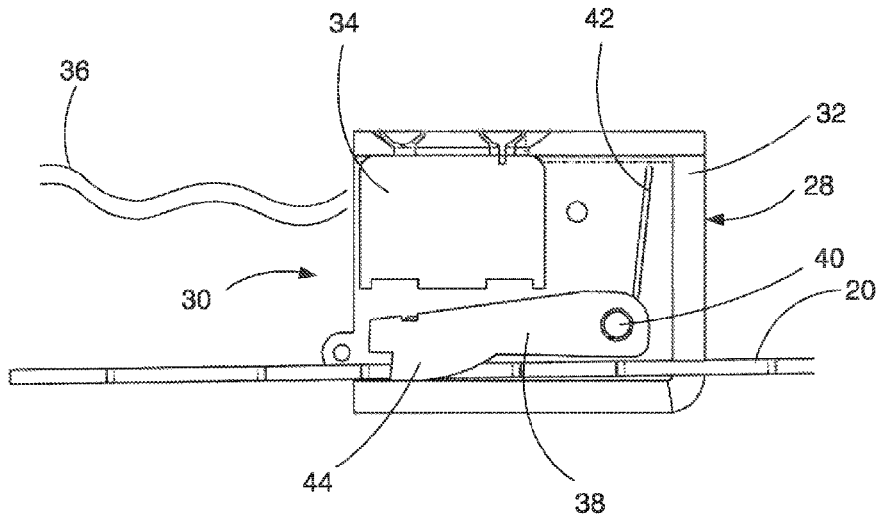
Figure 11E:
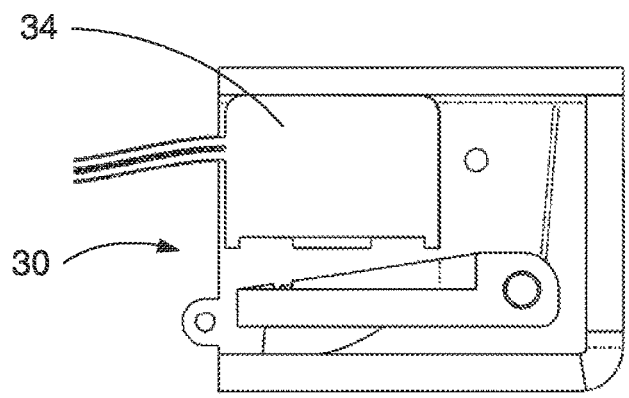
Figure 11F:
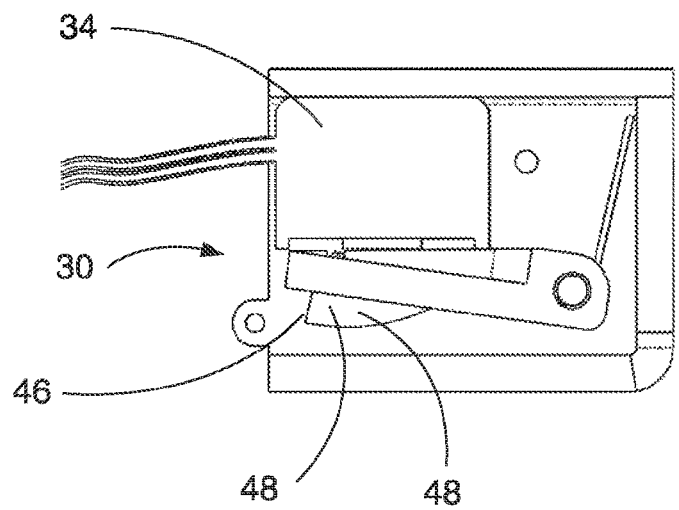

FIGS. 10A and 10B show the portion of lock apparatus 10 associated with chassis C. A lock buckle 28 is directly or indirectly attached to chassis engaging bracket 14, for example by a lock buckle holder 29, which is rigidly attached to the chassis bracket.

With further reference to FIGS. 11A-11F, lock buckle 28 includes a band-locking mechanism 30; and typically a lock-buckle housing 32. Band-locking mechanism 30 includes an electromagnet 34 operably connected to the motorcycle's battery (not shown), for example via electrical wires 36 and a lock-arm or lever 38 having a pivot 40 and biased by a biasing member such as leaf spring 42. Lever 38 has a one-way locking tooth 44 with a generally flat locking step or surface 46 and an angled or sloped surface 48, the surfaces 46 and 48 being typically similar to a ratchet gear tooth so that motion is one direction is allowed and in the other direction is by default prevented. In some embodiments, lever 38 is made of iron, or has, preferably at a top surface thereof; or in other embodiments the lever includes one or more iron members (not shown) so as to be attracted by electromagnet 34 when the electromagnet is powered.

Figure 13:
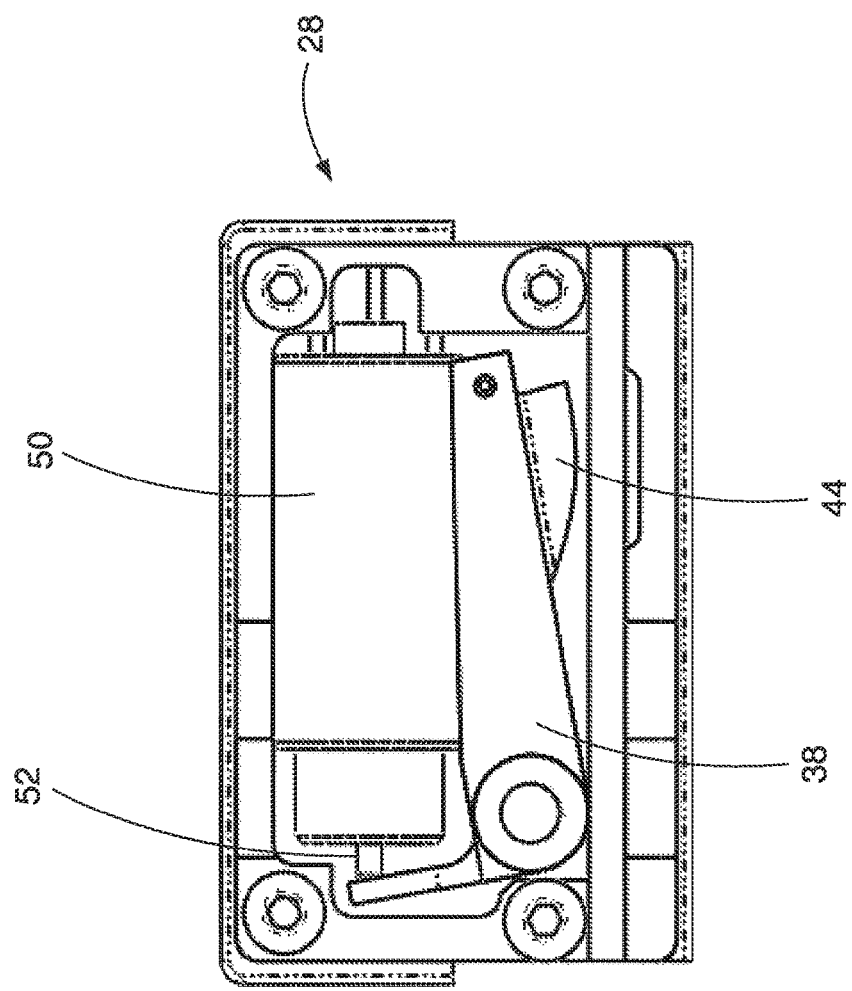
FIG. 13 is an internal side view of an embodiment of a lock buckle illustrating an exemplary band-locking mechanism of the device.

FIG. 13 shows another exemplary band-locking mechanism 30 wherein instead of electromagnet 34, the band-locking mechanism 30 incorporates a solenoid 50. Upon being powered, solenoid 50 pushes a lever-engaging rod 52 that lifts lever 38 removing tooth 44 from one of the openings 22 whereby locking band 20 is unlocked/released. When not powered, the default position is that rod 52 is retracted and does not push lever 38 so that band 20 can be inserted into band-locking mechanism 30 and tooth 44 enters one of the openings 22. It should be understood that electromagnet 34 and solenoid 50 represent exemplary electrically powered actuators and that in some embodiments, other equivalent mechanisms or components may be used.

In some embodiments, lock apparatus 10 further includes a mechanism (not shown) for stopping power to band-locking mechanism 30; in particular to electromagnet 34 (or solenoid 50 or other equivalent member) after a predetermined time, for example via a relay or timer. As a result, electromagnet 34 (solenoid 50, etc.) would not continue to draw power from the motorcycle's battery and thus lever 38 (and tooth 44) would be moved downward by leaf spring 42, after the aforementioned predetermined time.

When one wishes to park the motorcycle, the motorcycle is turned off and kickstand J is lowered. Lowering kickstand J pushes band 20 from a position shown in FIGS. 5 and 12A, to a position shown in FIGS. 6 and 12B. As a result, openings 22 move (to the left in FIGS. 11A-11D and 12A and 12B) and interface with sloped surface 48 of tooth 44 pushing the tooth upward so band 20 can continue to slide in band-locking mechanism 30. When kickstand J is in its ultimate downward position, the lever's locking tooth 44 is urged downward by leaf spring 42 so that the tooth typically projects into one of the openings 22. However, even if tooth 44 is not aligned with an opening 22, raising the kickstand again, without first activating electromagnet 34 will cause band 20 to be withdrawn from band-locking mechanism 30, thereby moving openings 22 until tooth 44 projects into one of openings 22, as any similar ratcheting-type mechanism would do. Thus, kickstand J cannot be significantly raised; i.e. is locked.

To use the motorcycle again, one powers the motorcycle battery, typically by turning an ignition key. This powers electromagnet 34, which overpowers leaf spring 42 and attracts/raises lever 38 upward so that its tooth 44 will be clear of the openings 22 of band 20. Thus, kickstand J can be fully raised and the motorcycle can be ridden.

Figure 14:
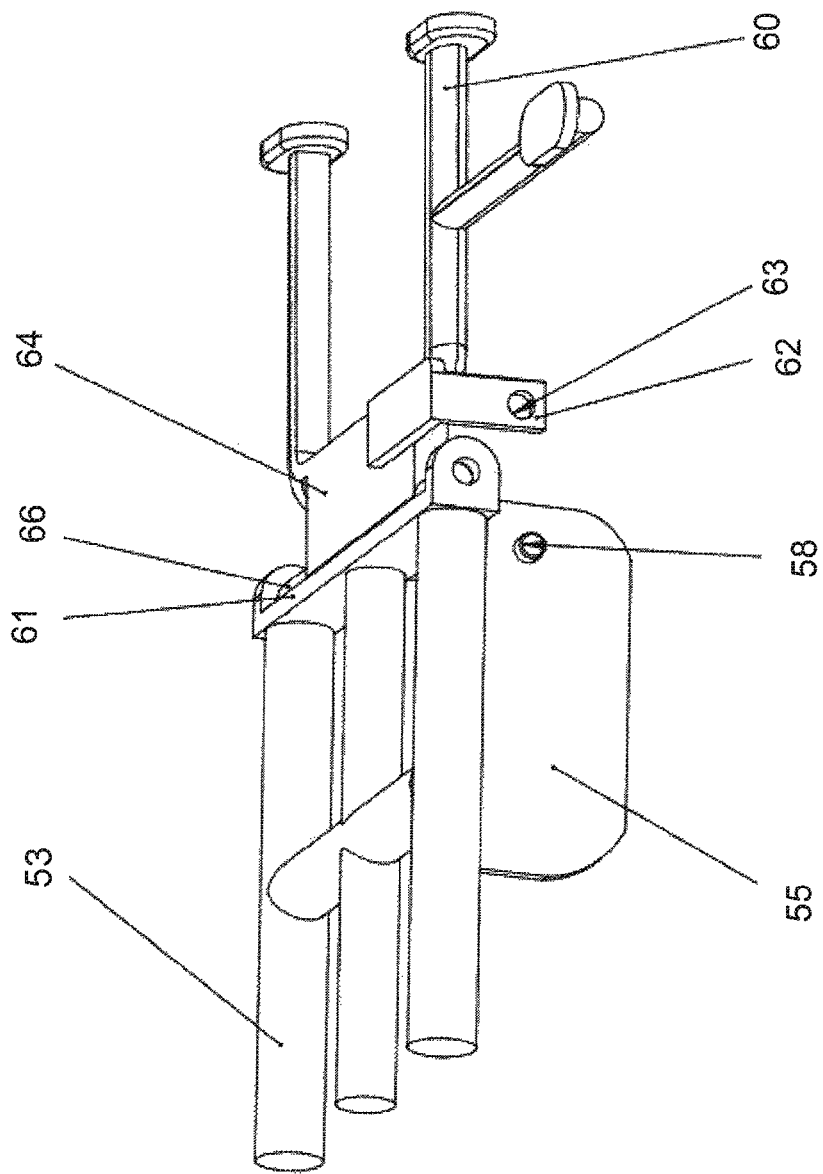
FIG. 14 is a perspective view of a motorcycle anti-theft device, according to another embodiment of the invention, showing the kickstand in a raised position.
Figure 15:
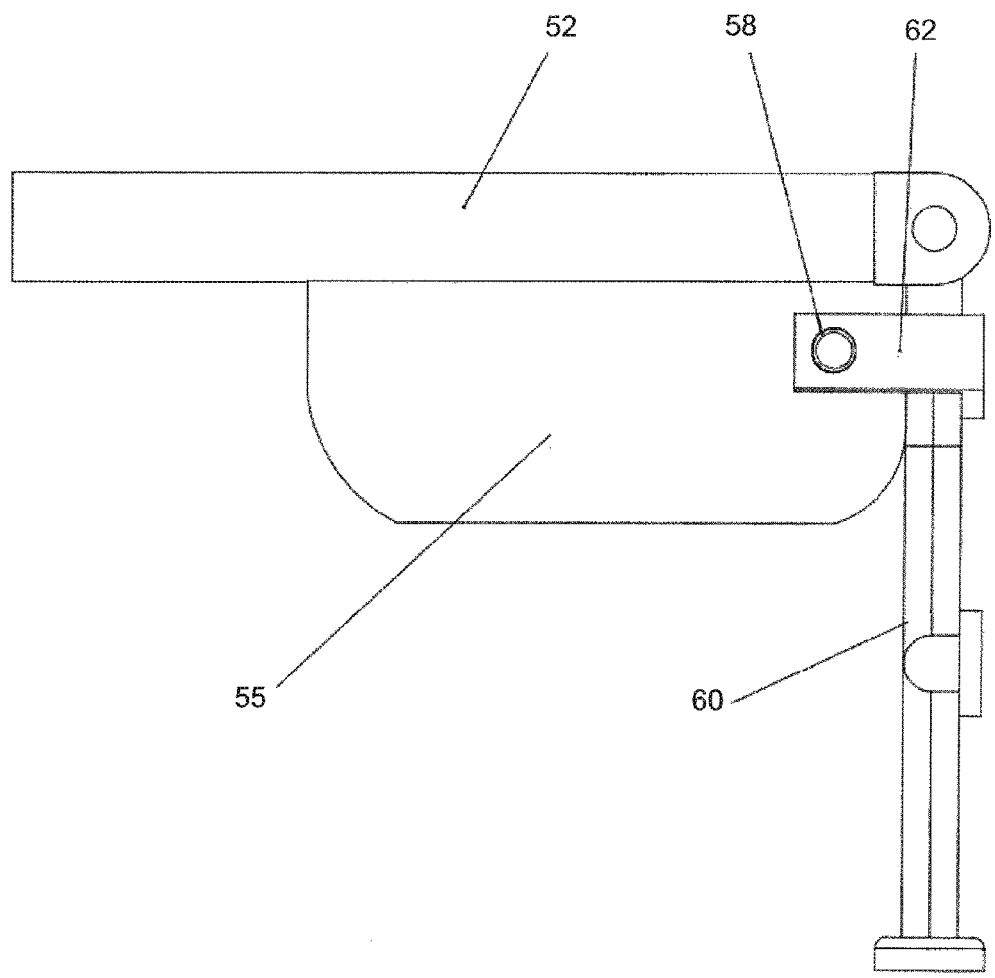
FIG. 15 is a front view of the device of FIG. 14, showing the kickstand in a lowered position.

FIGS. 14 and 15 illustrate another embodiment of the invention, wherein the kickstand is shown in a raised position in FIG. 14 and in a lowered position in FIG. 15.

The anti-theft device includes an actuator housing 55, fixedly attached to the bottom of a chassis portion 53; and a bracket 62, attached to pivotable kickstand 60. In some embodiments, actuator housing 55 is made of a substantially impenetrable metallic casing.

A rectilinear block 64 integrally formed with, or connected to, kickstand 60 is coupled with a substantially horizontal rod 66 that is rotatably mounted in a stationary mount 61, which is in abutting relation with chassis portion 53. Bracket 62 is downwardly extending and substantially perpendicular to the upper surface of block 64, which is considered to be the "upper surface" when kickstand 60 is in a raised position. An aperture 63 is formed in bracket 62.

An electrically displaceable pin 58 is biased to normally protrude from a side wall 54 (FIG. 18) of actuator housing 55. Pin 58 is substantially parallel to bracket 62 when kickstand 60 is in a raised position, as illustrated in FIG. 15. Bracket 62 is engageable with pin 58, which is receivable in aperture 63, when kickstand 60 is lowered while being pivoted about rod 66. While kickstand 60 is in the lowered position and in contact with the underlying ground surface, pin 58 is caused to become immobilized with respect to actuator housing 55, as will be described hereinafter. This immobilization prevents disengagement of bracket 62 from pin 58, and therefore prevents the motorcycle from being driven, particularly by an unlawful person. Thus the anti-theft device functions as a deterrent to thieves.

FIG. 15 schematically illustrates actuator unit 70, according to one embodiment of the invention. Actuator unit 70 includes an immobilizing device 72 for fixating pin 58 after having been engaged with bracket 62, to retain the kickstand in the lowered position even if pin 58 is tampered with by an unlawful person. Immobilizing device 72 may be electrically actuated, or may be a mechanical lock connectable with pin 58 and mounted in actuator housing 55. Also, a release device 74 for releasing pin 58 from side wall 54 of actuator housing 55 when a user desires to ride the motorcycle is provided. In addition, actuator unit 70 has a controller 77 for commanding operation, by a wired or wireless command signal S, of one or more of immobilizing device 72 and release device 74 in response to the transmission thereto of an initiating signal I, as well as relevant circuitry 78.

Actuator unit 70 may also include an antenna 79 for receiving an externally originated initiating signal, such as a radio wave signal or an infrared signal generated by a remote control device. Antenna 79 may be a printed antenna which is fitted in an interface with the metallic casing, in order to suitably receive the externally originated initiating signal. Alternatively, antenna 79 may include a short range transceiver, e.g. a Bluetooth transceiver. Initiating signal I is transferred in turn to controller 77 by circuitry 78.

Alternatively, initiating signal I may be transmitted via a wired connection, for example after a key in the ignition switch has been turned and a relevant actuator/button has been actuated/pressed.

Figure 16:
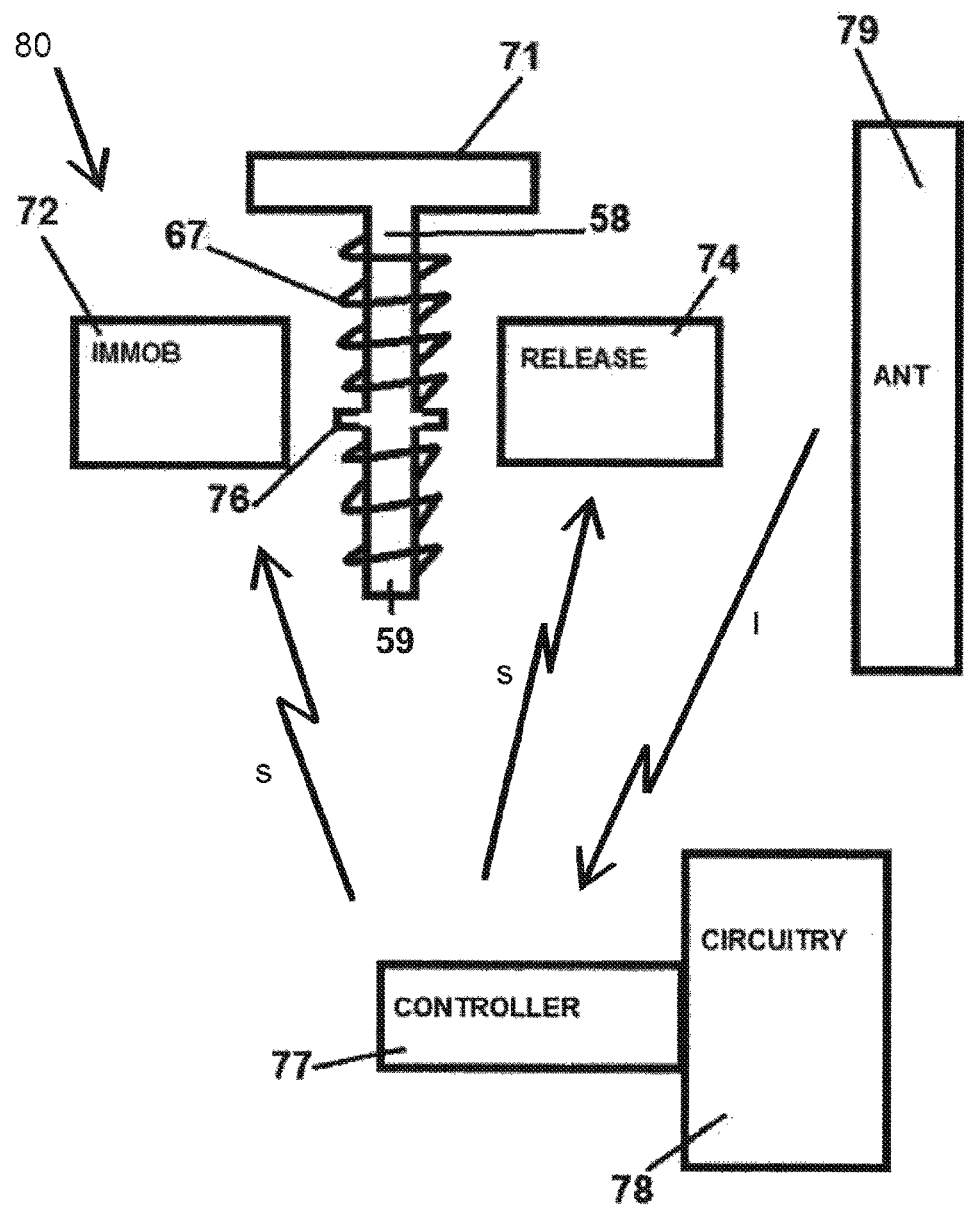
FIG. 16 is a schematic illustration of an actuator unit, according to one embodiment of the invention.
Figure 17:
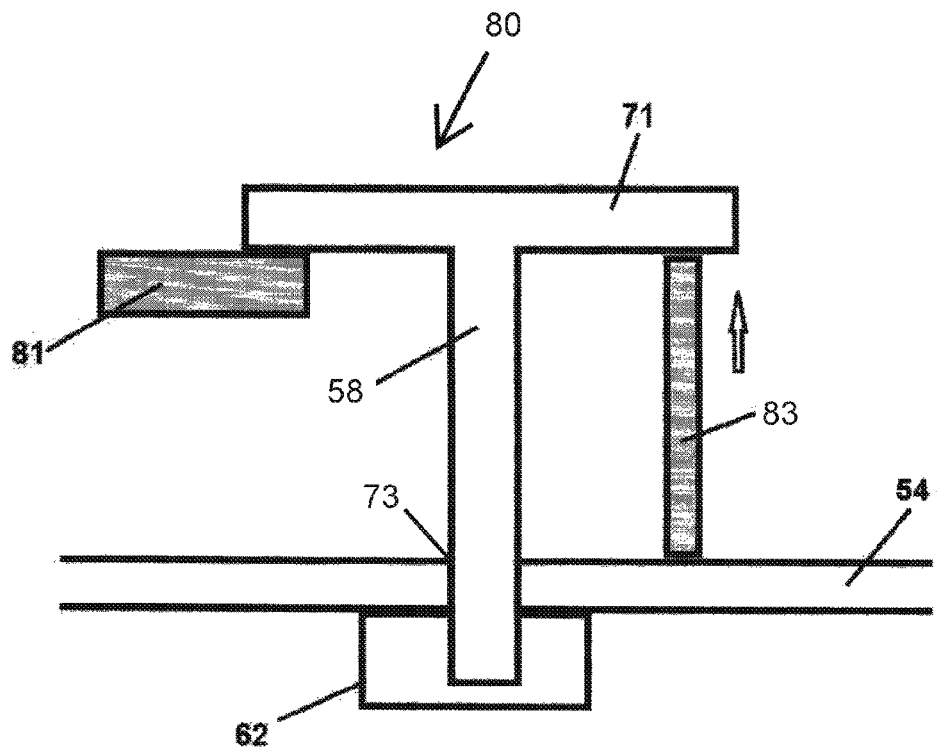
FIG. 17 is a schematic illustration of an actuator unit, according to another embodiment of the invention.
Figure 18:
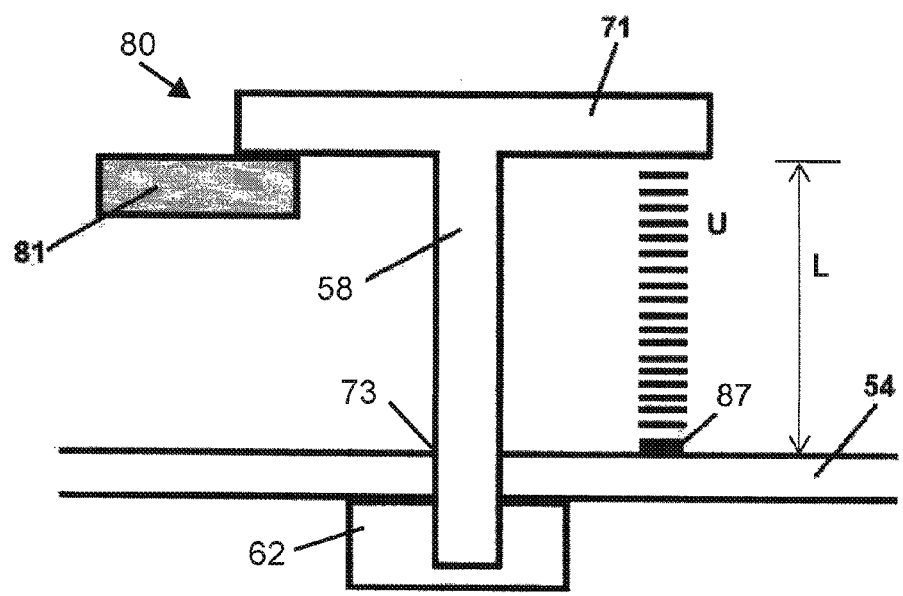
FIG. 18 is a schematic illustration of an actuator unit by which the initiating signal is generated by an ultrasonic sensor.

Referring to FIGS. 16-18, pin 58 typically has a rounded proximal end 59 to facilitate engagement with bracket 62 being pivoted when the kickstand is being set to a lowered position. Bracket 62 therefore displaces pin 58 distally during initial contact; however, since pin 58 is proximally biased by spring 67, which is preferably connected to both the pin and the wall of actuator housing 55, the pin will be subsequently proximally displaced to facilitate engagement with the bracket. Pin 58 is shown to have a distal flange 71 for engagement with release device 74 and an intermediate collar 76 to prevent excessive pin movement through an aperture 73 formed in side wall 54 of the actuator housing 55 through which pin 58 normally protrudes, although other pin configurations are also within the scope of the invention.

In actuator unit 80, the immobilizing device 72 shown in FIG. 16 is embodied by an electromagnetic device 81 (FIGS. 17 and 18) in abuttable relation with flange 71 of pin 58 and secured to a stationary surface of the actuator housing, such as a bottom surface thereof. When the multi-coiled electromagnetic device 81 is energized, e.g. by the motorcycle battery, upon being commanded by controller 77, a magnetic field is induced for effecting electromagnetic engagement with pin 58, when made of ferromagnetic material and functioning as the magnetized armature. This electromagnetic engagement immobilizes pin 58 and prevents unwanted displacement thereof. Likewise electromagnetic device 81 is de-energized upon being commanded by the controller, for example in order to operate release device 74.

Release device 74 may include a linear solenoid 83, e.g. of the push-pull type, connected to side wall 54 of actuator housing 55. When commanded by controller 77, following de-energization of electromagnetic device 81, such as after transmission of an initiating signal, a plunger of linear solenoid 83 is extended by a sufficient stroke to apply a force to pin flange 71 that causes the pin to become disengaged from bracket 62.

In actuator unit 80 illustrated in FIG. 18, the initiating signal is generated by ultrasonic sensor 87 mounted on side wall 54 of actuator housing 55. Ultrasonic waves U are generated by sensor 87 and directed to flange 71 of pin 58. Sensor 87 also receives the waves U reflected from flange 71, and is thereby able to determine the instantaneous distance L between side wall 54 and flange 71. Normally distance L is a nominal unchanged value, but increases when pin 58 is distally displaced upon engagement of bracket 62 therewith. Thus, ultrasonic sensor 87 will transmit initiating signal I to the controller 77 upon detecting that distance L has increased more than a predetermined value. Electromagnetic device 81 will then be energized at a predetermined time following transmission of initiating signal I.

It will be appreciated that any other sensor well known to those skilled in the art, such as a proximity sensor, may be employed to generate initiating signal I, in response to kickstand lowering.

It will be appreciated that any embodiment described herein may be provided with any combination of the aforementioned immobilizing device and release device.

While some embodiments of the invention have been described by way of illustration, it will be apparent that the invention can be carried out with many modifications, variations and adaptations, and with the use of numerous equivalents or alternative solutions that are within the scope of persons skilled in the art, without exceeding the scope of the claims.

What is claimed is:

1. A motorcycle anti-theft device, for a motorcycle comprising a pivotable kickstand, a chassis and an electrical power source, said device comprising:
    a mechanism configured to lock said kickstand after being set to a lowered position; and
    an actuator unit comprising an electromechanical device connected to said power source configured to directly drive, when activated, an element to unlock said kickstand,
    wherein the kickstand locking mechanism comprises a bracket connected to the kickstand and formed with an aperture, and the actuator unit comprises an electrically displaceable pin which is biased to normally protrude from a wall of an actuator housing, said pin being receivable in the aperture of said bracket to lock the kickstand when said kickstand is set to the lowered position and being subsequently driven by the electromechanical device to unlock the kickstand following transmission of an initiating signal to the actuator unit.

2. The anti-theft device according to claim 1, further comprising an immobilizing device mounted in the actuator housing for fixating the pin after having been engaged with the bracket.

3. The anti-theft device according to claim 2, further comprising a controller for commanding operation of one or more of the immobilizing device and the electromechanical device in response to the transmission of the initiating signal.

4. The anti-theft device according to claim 3, further comprising an antenna for receiving an externally originated initiating signal generated by a remote control device, and circuitry interfacing between said antenna and the controller, for transmitting the initiating signal to the controller.

5. The anti-theft device according to claim 4, wherein the initiating signal is a radio wave signal or an infrared signal.

6. The anti-theft device according to claim 3, wherein the pin is configured with a distal flange and comprises a ferromagnetic material.

7. The anti-theft device according to claim 6, wherein the immobilizing device is an electromagnetic device which is secured to a stationary surface of the actuator housing and is in abuttable relation with the flange, a magnetic field being induced for effecting electromagnetic engagement with the pin when said electromagnetic device is energized.

8. The anti-theft device according to claim 7, wherein the electromechanical device comprises a linear solenoid in driving engagement with the flange, a plunger of said linear solenoid being extendable, following de-energization of the electromagnetic device, by a sufficient stroke to apply a force to the flange and to cause the pin to become disengaged from the bracket.

9. The anti-theft device according to claim 7, wherein the actuator unit further comprises a sensor in data communication with the controller, for generating the initiating signal, in response to engagement of the pin and bracket.

10. The anti-theft device according to claim 9, wherein the sensor is an ultrasonic sensor for generating ultrasonic waves that are directed to the flange and for receiving the waves that are reflected from the flange in order to determine an instantaneous distance between a wall of the actuator housing wall and the flange, the initiating signal being transmittable from said ultrasonic sensor to the controller when said instantaneous distance has increased more than a predetermined value.

11. The anti-theft device according to claim 10, wherein the electromagnetic device is energizable at a predetermined time following transmission of the initiating signal.

12. The anti-theft device according to claim 2, wherein the immobilizing device is a mechanical lock connectable with the pin and mounted in the actuator housing.

13. The anti-theft device according to claim 1, wherein the actuator housing is fixedly attached to a portion of the chassis portion and is made of an impenetrable metallic casing.

14. A motorcycle anti-theft device, for a motorcycle comprising a pivotable kickstand, a chassis and an electrical power source, said device comprising:
- a mechanism configured to lock said kickstand after being set to a lowered position; and
- an actuator unit comprising an electromechanical device connected to said power source configured to directly drive, when activated, an element to unlock said kickstand,
- wherein the kickstand locking mechanism comprises: a) a chassis engaging mechanism including a chassis engaging bracket, for fixing one end of the device to the chassis; b) a kickstand engaging mechanism, including a kickstand engaging bracket, for attaching the other end of the device to the kickstand; c) a locking band, one end thereof attached to said kickstand engaging bracket, and the other end of said band comprising at least one opening disposed lengthwise along said band; and d) a lock buckle associated with said chassis engaging mechanism comprising the actuator unit.

15. The anti-theft device according to claim 14, wherein the actuator unit is operable to reversibly lock the locking band by a one-way locking engagability with the at least one opening of the locking band.

16. The anti-theft device according to claim 14, wherein the at least one opening is a plurality of openings.

17. The anti-theft device according to claim 14, wherein the lock buckle is operably attached to the chassis engaging bracket by a lock buckle holder.

18. The anti-theft device according to claim 14, wherein the lock buckle comprises a lever with a tooth adapted to ratchedly enter the at least one opening.

19. The anti-theft device according to claim 14, wherein the lock buckle is housed with a lock-buckle housing.

\* \* \* \* \*